United States Patent [19]

Grüning et al.

[11] Patent Number: 4,715,986
[45] Date of Patent: Dec. 29, 1987

[54] PARTICLES, MODIFIED AT THEIR SURFACE BY HYDROPHILIC AND HYDROPHOBIC GROUPS

[75] Inventors: Burghard Grüning; Ulrich Holtschmidt; Goetz Koerner, all of Essen; Gerd Rossmy, Haltern-Lavesum, all of Fed. Rep. of Germany

[73] Assignee: Th. Goldschmidt AG, Essen, Fed. Rep. of Germany

[21] Appl. No.: 716,031

[22] Filed: Mar. 26, 1985

[30] Foreign Application Priority Data

Mar. 30, 1984 [DE] Fed. Rep. of Germany ....... 3411759

[51] Int. Cl.$^4$ ............................ B01J 13/00; C09C 3/00
[52] U.S. Cl. .................................. 252/315.2; 252/302; 252/363.5; 106/308 Q; 428/403; 428/407
[58] Field of Search ................... 252/363.5, 315.2, 302; 106/308 Q, 308 M; 428/407

[56] References Cited

U.S. PATENT DOCUMENTS

| | | |
|---|---|---|
| 2,828,265 | 3/1958 | Van Strien ....................... 252/315.2 |
| 3,049,498 | 8/1962 | Sawyer ............................ 252/315.2 |
| 3,433,753 | 3/1969 | Farkas ............................. 106/308 Q |
| 3,450,666 | 6/1969 | Nease .............................. 106/308 Q |
| 3,639,616 | 2/1972 | Lichtimann et al. ......... 252/363 S X |
| 3,706,708 | 12/1972 | Kearnan ....................... 252/363 S X |
| 3,951,849 | 4/1976 | Vickery ........................ 252/363 S X |
| 3,969,125 | 7/1976 | Urs ............................... 106/308 Q X |
| 4,263,050 | 4/1981 | Yamanaka et al. ............ 106/308 M |
| 4,297,145 | 10/1981 | Wolff et al. ..................... 106/308 Q |
| 4,316,807 | 2/1982 | McDaniel et al. ........... 252/315.2 X |

*Primary Examiner*—John F. Terapane
*Assistant Examiner*—Susan Wolffe
*Attorney, Agent, or Firm*—Toren, McGeady & Associates

[57] ABSTRACT

Particles less than 100 $\mu$m in size and modified by hydrophilic and hydrophobic groups wherein the hydrophilic and hydrophobic groups are distributed anisotropically on the surface of the modified particles. Processes for the preparation of such particles and the use of such particles as surface active products, especially for stabilizing or destablizing emulsions and foams as well as for tertiary oil recovery.

10 Claims, No Drawings

PARTICLES, MODIFIED AT THEIR SURFACE BY HYDROPHILIC AND HYDROPHOBIC GROUPS

BACKGROUND OF THE INVENTION

1. Field of the Invention

The invention relates to particles less than 100 μm in size, which are insoluble in organic solvents and water and modified at their surface by hydrophilic and hydrophobic groups. It also relates to processes for modifying these particles as well as to the use of the modified particles as surface active products, especially for stabilizing or destabilizing emulsions and foams and for tertiary oil recovery.

2. Description of the Prior Art

The hydrophilic or hydrophobic behavior of a solid is determined essentially by the groups at its surface. For example, particles which have hydroxyl groups at their surface are usually hydrophilic. Such behavior is shown, for example, in finely divided pyrolytic silica. However, if there are hydrocarbon groups, such as, alkyl groups, and especially longer chain alkyl groups, at the surface of the particle, then the particles have hydrophobic properties.

It has long been known that it is possible to influence the hydrophilic or hydrophobic character of inorganic or organic particles. This can be accomplished by adsorption of substances on the surface of a particle, especially by chemical reactions with reactive groups, which are at the surface of the particle. The state of this art is shown extensively in the literature.

For example, German Offenlegungsschrift No. 23 13 073 describes a process for chemically modifying the surfaces of inorganic solids having hydroxyl groups. The characteristic feature of the process is that alkyl chains, which have reactive hetero atoms, are chemically linked to these surfaces. Moreover, these reactive hetero atoms can be replaced by chemical functional groups. A typical example of such a modifying reaction is the conversion of the hydroxyl groups linked to the surface of the solid with bromomethylmethyldichlorosilane, wherein the bromine atom is being replaced in a further reaction by an $SO_3H$—, $NH_2$—, COOH— or a polyethylene glycol radical. Materials, such as, silicon dioxide (silica gel), aluminum oxide, titanium dioxide, zirconium dioxide, and other inorganic carriers, such as, glass spheres and sand, can be used as solids. The chemically modified solids are used as the stationary phase in a separating system, for example, in chromatography, or as a catalyst. It is evident that the suitability of such modified solids as the stationary phase in chromatography can be influenced significantly by such modifications of the surface, since the physical and chemical behavior of the modified solid relative to the mobile phase is determined essentially by the properties of its surface. Due to the nature of the modifying reaction and in view of the intended use, it may be assumed that the entire surface of the particles participates in the modifying reaction. If the modifying agent is used in an amount less than equivalent, so that not all of the reactive groups at the surface of the particles can be modified, it may be assumed that the distribution of the modified groups on the surface follows statistical laws so that the modified particle behaves equally hydrophilic or hydrophobic at any position on its surface.

German Offenlegungsschrift No. 21 07 082 discloses a surface-treated, pulverized silicon dioxide with a surface area of at least 10 $m^2/g$, which is characterized by the fact that it has a degree of hydrophobicity of 5 to 35, as measured by the methanol titration test. The methanol titration test, also referred to as the methanol number, indicates a frequently used specific quantity for determining the degree of hydrophobicity. The test is carried out by adding 0.2 g of the powder to be tested to 50 ml water in a 250 ml conical flask. If the powder has a hydrophobic surface, it is not wetted by the water and floats on the surface of the water. Then, methanol is slowly added from a burette until all of the powder to be tested has been wetted. The end point of the methanol addition is reached when all of the powder is suspended in the liquid. The methanol number is the percentage of methanol in the liquid methanol/water mixture, when the end point is reached.

In German Offenlegungsschrift No. 21 07 082, the silicon dioxide powder is hydrophobized by treating the surface with a silane, containing groups which react with the hydroxyl groups of the silica, as well as the hydrophobic groups. As a result of the reaction of the hydroxyl groups at the surface of the silicon dioxide with the reactive groups of the silane, the particles are covered with a coating in which the hydrophobic groups of the silane are extended toward the outside. An example of such a reactive siloxane is methyltriethoxysilane. A gradation of the hydrophobicity of such particles can be brought about by using organosilicon compounds for the modification, which also have hydrophilic groups, for example, oxyalkylene groups. This Offenlegungsschrift also mentions that such hydrophilic groups are distributed at random within the hydrophobic groups, that is, that the coating of the surface proceeds according to statistical laws so that the probability of encountering a hydrophilic or a hydrophobic group on the surface of a modified particle is always the same, depending on the concentration of these groups. According to the teachings of this Offenlegungsschrift, the surface-treated silicon dioxide increases the compatibility of silicon dioxide with fire extinguishing agents.

German Offenlegungsschrift No. 31 32 370 describes a process for the tertiary recovery of oil by means of surfactant flooding, in which an effective amount of a surface-modified silicon dioxide is added to the surfactant-containing aqueous liquid. The silicon dioxide is modified preferably with an α,ω-polysiloxanediol. Moreover, the silica has a particle size of 0.005 μm to 2 μm. It is added in an amount of 10 to 1,000 ppm to the surfactant solution. This Offenlegungsschrift states that the "silicon dioxide/dialkylsiloxane compound" is highly surface active because it consists of a hydrophobic and a hydrophilic portion. Since only the surface reaction with polysiloxanediol is described, it must be assumed that only the alleged hydrophilic portion in the remaining unmodified hydroxyl groups of the finely divided silicon dioxide is observed. German Offenlegungsschrift No. 31 32 370 does not describe how the silicon dioxide particles react with the polysiloxanediol. In accordance with the state of the art, it must be assumed that the siloxanediol is allowed to react with the surface of the silicon dioxide particles, resulting presumably in a condensation reaction which proceeds uniformly at all regions of the particle.

German Offenlegungsschrift No. 29 46 727 relates to a product used to separate water-oil mixtures. This product is prepared by reacting an inorganic solid having surface hydroxyl groups, with a silane having groups that react with the hydroxyl groups of the solid, such as, for example, halogen, alkoxy groups, or a halogenated hydrocarbon radical, which then, in a second step of the process, enters into a reaction with an N-substituted imide of an alkenyl-substituted dicarboxylic acid. After this modifying reaction, there is at the surface of the solid particle, a radical of relatively high molecular weight, which has hydrophilic NH-groups as well as hydrophobic alkenyl groups. The inorganic solid may be silicon dioxide, aluminum dioxide, titanium dioxide, zirconium dioxide, glass sepiolite or a zeolithic molecular sieve. If a filter bed is formed from particles so modified, and water contaminated with oil, or oil contaminated with water, is passed through this bed, the contamination is removed from the carrier phase.

Furthermore, German Patent No. 27 43 682, which is part of the state of the art, relates to the treatment of oxide or silicate particles with special organosilanes. These organosilanes have a substituent of oxyalkylene groups as well as hydrolyzable groups, which are intended to effect the linkage of the silane to the solid particles. The particles, so modified, show increased dispersebility and are intended to be used as fillers in heat-curable polyester compositions.

A common feature of all of these modified particles of the state of the art is that the hydrophilicity or hydrophobicity of the surface is influenced selectively in order to endow the particles with certain properties desirable for their technological application. These application-related technological properties are based especially on better compatibility and wettability of the particles with or by the medium containing the particles. The solids with modified surface properties known from the state of the art, have hydrophobic or hydrophilic groups, which are located at the surface of the particles in a uniform random distribution. Therefore, is is only possible to hydrophobize a hydrophilic particle more or less pronouncedly. This is shown by the distribution of the particles between two immiscible liquids.

If hexane, a nonpolar liquid, is placed over a layer of water, a polar liquid, and pyrogenic silica whose surface has not been treated, is added, then the untreated pyrogenic silica is distributed almost exclusively in the water because of the presence of hydroxyl groups on the surface of the silica. If the silica is hydrophobized according to one of the processes known from the state of the art so that practically all of the hydroxyl groups are modified and any remaining hydroxyl groups are sterically shielded, so that their contribution to surface properties can be disregarded, the silica so hydrophobized is distributed almost exclusively in the hexane phase. However, if the pyrogenic silica is only partially hydrophobized to varying extents, and the degree of hydrophobicity determined by the methanol number, then the distributions obtained between the two phases correlate with the degree of hydrophobization.

SUMMARY OF THE INVENTION

We have discovered surface modified solids of a particle size less than 100 μm which are insoluble in organic solvents and in water, wherein the hydrophilic and hydrophobic groups are distributed anisotropically on the surface of the particles.

The surfaces of the solid particles are altered not only with respect to the affinity of the particles for polar and nonpolar solvents, but the solid particles also achieve effects, particularly at the phase boundaries, which are similar to those known from surfactants. However, in contrast to surfactants, the modified solids are insoluble in the system and can therefore be removed from the system in a simple manner by filtration, centrifugation or similar procedures. Thus, this invention provides a new class of quasi surface active products suitable for a variety of commercial uses.

DESCRIPTION OF THE PREFERRED EMBODIMENT

The particles which are modified in accordance with the present invention are less than 100 μm in size and are insoluble in organic solvents and water. Their surface is modified by hydrophilic and hydrophobic groups in a manner, such that the hydrophilic and hydrophobic groups on the surface of the modified particles are distributed anisotropically.

More particularly, the hydrophilic and hydrophobic groups on the surface of the particles are not distributed according to the laws of statistics. Instead, the surfaces of the particles have separate regions of different hydrophilicity or hydrophobicity. Therefore, the hydrophilic and hydrophobic groups are present in separate domains. Moreover, the individual domains may be arranged in one surface and adjoin one another. Preferably, however, they are arranged separately on different surfaces of a stratified particle.

In order to be surface active, soluble surfactant compounds must contain hydrophilic and hydrophobic groups in the same molecule. Therefore, the invention resides in transferring the arrangement of hydrophilic and hydrophobic groups from the molecular domain or size of surfactants to the domain of solid particles ranging in size from about 10 nm to 100 μm.

When hydrophilic and hydrophobic groups are distributed anisotropically, these insoluble particles which are relatively coarse or large compared to the molecular domain or size, exhibit pronounced properties characteristic of surface active compounds, such as, for example, adsorption at an oil/water phase interface, whereas anisotropically modified solids, in contrast to soluble surfactants, are not suitable for decreasing interfacial tension.

The inventive particles thus anisotropically modified hydrophilically and hydrophobically, are particularly suitable for preparing relatively coarse emulsions that are stable for months. They can be used for stabilizing foams and are also suitable for use in petroleum displacement in tertiary oil recovery. Moreover, those skilled in the art will appreciate that the inventive solids have different properties in mixtures of polar and nonpolar systems and that these properties depend on the ratio of hydrophilic to hydrophobic groups. For soluble compounds, i.e., surfactants, this hydrophilic/hydrophobic equilibrium is frequently expressed by the HLB value. Although the inventive particles are insoluble, a certain similarity with soluble surfactants may be observed with respect to these particles, depending on the behavior of the hydrophilic/hydrophobic equilibrium.

The particles may be of an inorganic or an organic nature. Preferred are inorganic solids, especially silica in finely divided form and particularly, when produced pyrogenically. Finely divided oxides or hydrated oxides of magnesium, calcium, aluminum, yttrium, the lanthanides, titanium, zirconium and tin can also be used. Carbon, for example, in the form of carbon black, can also be used as inorganic solids. Organic compounds, natural or synthetic products, such as, polysaccharides, particularly, starch and cellulose, or organic polymeric compounds with reactive groups, can also be used. The reactive groups on the surface of the particles of silica and finely divided oxides or hydrated oxides are hydroxyl groups. When carbon black is used, carboxyl groups can be introduced by surface oxidation. The reactive groups of the polysaccharides are once again hydroxyl groups. With organic polymeric compounds, the choice of reactive groups is less restricted, since various polymers are known, which can have hydroxyl, carboxyl, mercapto or other reactive groups.

Modifying agents, known from the state of the art, can be used for the hydrophilizing and hydrophobizing reactions. As already described in the state of the art, polyoxyethylene groups are generally used as hydrophilizing groups. It is, of course, possible to replace a portion of the oxyethylene groups by oxypropylene groups. By so doing, the hydrophilicity of these polyoxyalkylene groups can be graded. However, not more than 30 mole percent of the oxyethylene groups should be replaced by oxypropylene groups, otherwise the hydrophilicity of the polyoxyalkylene group would be excessively diminished.

In accordance with the state of the art, the hydrophobizing groups may be hydrocarbon groups. Thus, especially alkyl groups and preferably those with more than 3 carbon atoms in the alkyl radical are considered. Particularly, alkyl groups derived from fatty acids with 10 to 22 carbon atoms are especially preferred for the hydrophobizing reaction. Instead of alkyl groups, aryl groups may be used. The above-mentioned groups may be substituted. A special hydrophobic and oleophobic effect is achieved by incorporating perfluorinated alkyl groups.

The hydrophilic and hydrophobic groups must have a reactive group with which they can be reacted with the reactive group at the surface of the particles to be modified. The hydrophilic and/or hydrophobic groups are linked with the particle matrix through a —CO, —SiO,

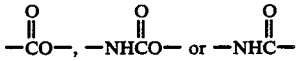

bridge. Other bridging elements are also possible. This is not of decisive importance for the present invention, since the essence of the invention lies less in the choice of the hydrophilizing or hydrophobizing groups and in the nature of their linkage with the matrix of the solid particles than in the anisotropic spatial distribution.

Furthermore, we have invented processes which ensure the anisotropic distribution of the hydrophilic and hydrophobic groups on the surface of the particles to be modified. The inventive process is carried out by:
(a) treating hollow microspheres, which have reactive groups at the outer and inner surfaces, in a conventional manner to hydrophilize or hydrophobize the outer surface of the microspheres;
(b) the hollow microspheres thus modified on their outer surface, are comminuted to a particle size below 100 μm; and
(c) the original inner surface of the particles obtained, exposed by the comminuting process, is hydrophobized or hydrophilized in a known manner.

Particularly, in part (a) of the process carried out first, every effort should be made to ensure that the outer surface of the hollow microspheres is modified as completely as possible. Therefore, it is advisable to use an excess of the modifying agent.

Microspheres of a silicate material, preferably glass, are preferably used for this process. Preferably used for the hydrophilizing modification are organosilicon compounds with the structural units $R^2O(C_2H_4O)_n$— and $\equiv SiOR^1$ in which up to 30 mole percent of the oxyethylene groups may be replaced by oxypropylene groups, $R^1$ and $R^2$ are alkyl radicals with 1 to 4 carbon atoms and n is a whole number not less than 1. As organosilicon compounds, silanes are preferred, having the formula $$R^2O(C_2H_4O)_n-R^4-Si(R^3)_{3-a}(OR^1)_a$$

in which up to 30 mole percent of the oxyethylene groups may be replaced by oxypropylene groups, a is 1, 2 or 3, $R^3$ is an alkyl radical with 1 to 4 carbon atoms, and $R^4$ is a divalent alkyl radical with 3 to 6 carbon atoms. Preferably, $R^4$ contains 3 carbon atoms. The reaction of the organosilicon compounds with the hydroxyl groups of the glass matrix is accomplished especially at elevated temperatures, for example, at temperatures of 80° C. to 140° C. and can be accelerated by the use of a catalyst, such as, p-toluenesulfonic acid.

In step (b), the particles are ground in a simple manner in a mortar or in a mill, such as, for example, a vibratory disk mill.

As a result of the comminution of the microspheres, whose outer surface has been modified, the original inner surface is now exposed for step (c) of the process, so that the reactive groups at this surface can be reacted with the hydrophobic modifying agent. For glass microspheres, preferably organosilicon compounds with the structure units $R^6$— and $\equiv SiOR^1$ are used as the hydrophobizing modifying agent, $R^6$ being an alkyl radical with more than 3 carbon atoms, an aryl or alkaryl radical or a polysiloxanyl radical. As organosilicon compounds, the use of silanes of formula $$R_c^7R_d^2Si(OR^1)_{4-(c+d)}$$

in which $R^7$ is an alkyl radical with more than 3 carbon atoms, an aryl or alkaryl radical, c=1 or 2, d=0 or 1, c+d=1, 2 or 3, or organopolysiloxanes with at least one —$OR^1$ group is specially preferred.

For example, the now exposed reactive groups of the glass matrix can be reacted in step (c) of the process in a known manner with dialkyldialkoxysilanes in which at least one of the alkyl radicals is an alkyl radical with more than 3 carbon atoms, an aryl radical or an alkaryl radical. Alkoxypolysiloxanes, whose alkoxy groups are derived from lower alcohols with 1 to 4 carbon atoms, can also be used for the reaction.

Particles, which to some extent have a laminar structure, the surfaces of the lamina being modified in each case hydrophilically or hydrophobically, are clearly obtained by this inventive process.

A simplified version of a further inventive process for preparing the anisotropically modified particles comprises in each case, one particle is hydrophobized, a second particle is separately hydrophilized and the two particles are coupled chemically.

Thus, in the inventive process, the following steps are carried out:
(a) a portion of the particles to be modified are hydrophilized in a known manner by a partial conversion of the reactive groups at their surface, (b) a portion of the particles to be modified are hydrophobized in a known manner by a partial conversion of the reactive groups at their surface, (c) the modified particles obtained according to either (a) or (b) are reacted with a stoichiometric excess, relative to the remaining reactive groups, of a difunctional compounds; and (d) the particles obtained in accordance with (c) are coupled with the particles obtained according to (b) or (a) by reacting the reactive groups.

This process can be carried out, for example, with a microgel containing hydroxyl groups, prepared by emulsion polymerization of divinylbenzene and subsequent conversion of the vinyl groups at the surface into hydroxyethyl groups using known techniques (Makromolekulare Chemie 178 (1977), 1689 to 1692). In step (a) of the process, a portion of the microgel is first of all reacted with a substoichiometric amount of a hydrophilizing agent relative to the hydroxyl groups of the microgel. As hydrophilizing agent for this purpose, a polyether isocyanate, preferably one having the formula

$R^2O(C_2H_4O)_nCONHR^5NCO$ in which up to 30 mole percent of the oxyethylene groups may be replaced by oxypropylene groups and $R^5$ represents a divalent hydrocarbon radical, is particularly suitable. The use of a substoichiometric amount of polyether isocyanate ensures that a portion of the hydroxyl groups of the microgel is retained.

In step (b), a second portion of the microgel is then used, also with substoichiometric amounts of a hydrophobizing agent. In this case, compounds of formula $R^7COCl$, in which $R^7$ is an alkyl radical with more than 3 carbon atoms, are especially suitable. Fatty acid chlorides, which are derived from fatty acids with 10 to 22 carbon atoms, are particularly suitable. After the hydrophobizing modification, hydroxyl groups are also retained with this second portion. In step (c) of the process, the remaining hydroxyl portions are reacted with an excess of diisocyanate. As the diisocyanate, the known compounds of the type $OCNR^8NCO$ can be used, in which $R^8$ is a divalent hydrocarbon radical, an alkylene radical with 2 to 6 carbon atoms or an aryl radical. Instead of diisocyanates, it is also possible to use, for example, dicarboxylic acid chlorides. However, diisocyanates are preferred as coupling agents for linking particles with reactive hydroxyl groups. Therefore, if portions, partially modified hydrophilically, are reacted with diisocyanate in step (c), a hydrophilic portion is obtained, which has free isocyanate groups. This portion is now reacted in order to couple it to the partially hydrophobic portion, which still has reactive hydroxyl groups.

In this connection, it does not matter whether the reaction with the diisocyanate or the dicarboxylic acid or derivatives thereof in step (c) is carried out with the partially hydrophilized or the partially hydrophobized particles.

It will be understood by those skilled in the art that particles are formed on which domains of hydrophilic groups and domains of hydrophobic groups which are clearly separate from one another, are formed locally.

Glass powder, pyrogenically produced silica or finely divided carbon black can also be treated in much the same way as the microgel that contains hydroxyl groups.

If relatively bulky hydrophilizing and/or hydrophobizing groups are used in this second inventive process, it may happen that these groups hinder the coupling reaction between the partially hydrophilized and the partially hydrophobized portions (a) and (b). It may however also be the case that the remaining reactive groups of the partially hydrophilized and/or hydrophobized portions are to be converted into other reactive groups. This is possible according to a variation of the second inventive process, which is characterized by the fact that during or immediately after steps (a) and (b) of the process and before step (c), the remaining reactive groups are reacted with at least a stoichiometric amount of an at least difunctional compound and that the portions so obtained, in which the reactive groups have been introduced, are used for steps (c) and (d).

This variation of the process can be explained by means of an example.

Pyrogenically produced silica, for example, is used as the solid particles. A portion of this silica is hydrophilized with a silane having polyoxyalkylene groups, as illustrated by the formula:

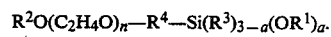

$R^2O(C_2H_4O)_n-R^4-Si(R^3)_{3-a}(OR^1)_a.$

At the same time, or immediately after the hydrophilizing reaction, the remaining reactive groups of the silica are allowed to react with an excess of a difunctional compound. An aminoalkylalkoxysilane, especially a γ-aminopropylalkoxysilane is particularly suitable in the case of silica. The second portion of silica is hydrophobized in the aforementioned manner by partial reaction of the hydroxyl groups, the remaining hydroxyl groups of the silica also being reacted with γ-aminoalkylalkoxysilane. Any free hydroxyl groups still present in the silica can be blocked, for example, by trimethylating with hexamethyldisilazane.

There are now two portions of silica, one of which has hydrophilic groups and silicon linked reactive aminoalkyl groups. One of the two portions can now be reacted in the aforementioned manner with a stoichiometric excess of a difunctional compound, preferably a diisocyanate. Subsequently, the two portions are mixed and the coupling reaction is carried out.

A third possibility for producing the inventive anisotropically modified particles comprises:

(a) partially hydrophobizing the particles in a known manner, (b) adding the particles obtained in (a) to a mixture of a polar solvent and a nonpolar solvent, which is not miscible with the polar solvent, (c) dissolving the hydrophilizing modifying agent in the polar solvent and dissolving the hydrophobizing modifying agent in a nonpolar solvent, (d) adjusting the reaction conditions to those required for the modifying reaction, and (e) removing the modified particles from the solvent mixture.

This process is explained using the modification of finely divided, hydrated aluminum oxide as an example. The hydrated aluminum oxide is first partially hydrophobized in a known manner. The product thus treated, is subsequently added to a mixture of a polar solvent and nonpolar solvent, which is not miscible with the polar solvent. The partial hydrophobization of step (a) effects an approximately balanced wetting of the solid particles by the two liquid phases. A hydrophilizing agent is then added to the polar solvent and a hydrophobizing agent to the nonpolar solvent. Dimethylformamide, for example, can be used as a polar solvent and polyoxyethylenetrialkoxysilane can be added to it. Hexane can be used as a nonpolar solvent and a silane of formula $$R_c^7R_d^2Si(OR^1)_{4-(c+d)}$$

is added to it. The mixture of solvents is then heated, so that an anisotropic modification of the hydrated aluminum oxide particles takes place at the interface, where they have accumulated. The phase boundary between the immiscible solvents can be enlarged by stirring and by doing so, the grafting reaction at the phase boundary can be promoted.

Finely divided, dried starch, for example, swelling starch, can be hydrophilized and hydrophobized in an analogous manner.

The properties of the modified solid particles produced can be fixed and adapted to the requirements of the intended application by the particle size and above all by varying the hydrophilic and hydrophobic substituents with respect to structure, molecular weight and amount applied.

For instance, it is easily possible to treat pyrogenic silica with different amounts of a hydrophilic silane and different amounts of a hydrophobic silane and, thus produce products which are clearly different with respect to their dispersability in polar and nonpolar solvents.

The stability of dispersions in different solvents, such as, in water, ethanol and toluene, permits the products to be differentiated clearly with respect to their hydrophobicity or hydrophilicity. Products which produce dispersions of different stability, are also clearly different in their effectiveness in particular applications, such as, for example, the displacement of oil from oil-saturated sand beds.

The finely divided hydrophobically/hydrophilically modified solids, built up by linking hydrophobic and hydrophilic portions, can be measured by a Langmuir film balance and the results clearly show the hydrophilic and hydrophobic grafting to the surface of a particle. These modified solids are particularly suitable for such measurements because, on the one hand, the nature of the synthesis necessarily results in the spatial separation of hydrophilic and hydrophobic domains, and, on the other hand, the finely divided components modified exclusively hydrophobically or exclusively hydrophilically, are available for comparison purposes. The fact that these components are linked proves the successful synthesis of an inventive particle. For example, while the exclusively hydrophobic product becomes more hydrophilic due to the adsorption of palmitic acid, and the exclusively hydrophilic product becomes more hydrophobic due to adsorption of the fatty acid, no changes in properties due to adsorption of palmitic acid can be identified in the product formed by linking the hydrophilic and hydrophobic preliminary stages.

The inventive solid particles show pronounced activity at phase interfaces. Provided that their hydrophobic and hydrophilic substituents are suitably chosen, they may, for example, be used as emulsifiers. With the help of such solid particles, it is possible to produce coarsely particulate emulsions, which are remarkably resistant to coalescense in spite of their large droplet size. Moreover, a further significant property of the inventive solids is that the solids can easily be removed from the emulsified system, for example, by filtration, thus breaking the emulsion.

By suitably matching the hydrophobic modification to the hydrophilic modification, the inventive solid particles can also serve as effective emulsion breakers. It is advantageous to disperse the solid particles before use in a solvent. It is particularly advantageous to use the inventive solid particles together with known demulsifiers, in which case a synergism is frequently observed.

The inventive solid particles can also contribute to improve the action of known surfactants in the formation and stabilization of aqueous foams.

Furthermore, the inventively modified solids can be used to particular advantage in tertiary oil recovery. They can be especially added to the surfactant solution for flooding processes and lead to increased oil displacement.

The preparation of various anisotropically modified solids of the invention is shown in the following examples. In addition, the surface active properties of these products and their applicability are described.

EXAMPLE 1

Hollow microspheres, consisting of inorganic silicates and filled with air, are commercially available under the name of Q-Cel ®. The average particle diameter is 65 $\mu$m and the wall thickness is about 1 $\mu$m. Gaseous hydrogen chloride (5 ml) is passed through a suspension of 10 g of these hollow microspheres in 300 ml of dry petroleum naphtha with thorough stirring. The suspension is subsequently mixed with 0.42 g of methyloctadecyldimethoxysilane and the mixture is heated for 20 hours under reflux with exclusion of moisture. After cooling, the solid is filtered off, washed and dried. It has a carbon content of 1.1%. The modified hollow microspheres are mixed once again with 5 ml of dry petroleum naphtha and milled in a vibrating disk mill for 15 minutes to a particle size of 1 to 20 $\mu$m, so that the average particle size is 5 $\mu$m. The thickness of the particles is determined by the wall thickness of the hollow microsphere. The platelet form of the particles can be identified clearly under the microscope. The particles are flushed out of the mill with 100 ml of dry petroleum naphtha. The suspension is diluted with a further 150 ml of petroleum naphtha and heated with exclusion of moisture under reflux for 20 hours with 0.42 g of a silane having the formula $$CH_3O(CH_2CH_2)_8(CH_2)_3Si(OC_2H_5)_3$$

After cooling, the solid matter is filtered off, washed and dried. It has a carbon content of 1.7%.

EXAMPLE 2

(A) A pyrogenic silica (100 g), with an average particle size of 12 nm and a surface area of 200 m²/g, is suspended in 1,300 ml of dry petroleum naphtha and heated for 24 hours with stirring under reflux with exclusion of moisture together with 4.9 g of the silane having the average formula $$CH_3O(CH_2CH_2O)_9(CH_2)_3Si(OC_2H_5)_3$$

and 4.38 g of γ-aminopropyltriethoxysilane. After cooling, the solid matter is filtered off, Soxhlet extracted for 18 hours with toluene and dried. The product contains 15.1% carbon and 0.4% nitrogen.

The dry product is powdered finely and mixed with 5 g of hexamethyldisilazane in a flask with reflux condenser. The reaction mixture is heated for 4 hours by immersing it in an oil bath heated to 130° C. Subsequently, the product is dried at 20 torr (2,700 Pa) and 40° C. The product contains 16.7% carbon.

(B) By the procedure described under (A), 100 g of the same pyrogenic untreated silica in petroleum naphtha is reacted for 24 hours with 29.44 g of octadecyltriethoxysilane and 4.38 g of γ-aminopropyltriethoxysilane and subsequently isolated. The product contains 13.4% carbon and 0.35% nitrogen.

The pulverized, dry product is then reacted with 5 g of hexamethyldisilazane and dried, as described under (A). Elementary analysis reveals 14.1% carbon. The dry product is suspended once again in 1,300 ml of dry petroleum naphtha and stirred for 3 hours at 60° C. with 11 g of 1,6-diisocyanatohexane and 0.13 g of 1,4-diazabicyclo(2,2,2)octane. After the reaction, the product is filtered off and Soxhlet extracted with toluene for 15 hours. The product contains 0.72% isocyanate groups after drying.

The product (115 g) prepared under (A), 132 g of the product prepared under (B) and 0.25 g of 1,4-diazabicyclo(2,2,2)octane are mixed with the least amount of petroleum naphtha required for obtaining a barely stirrable suspension, which is heated for 60 hours under reflux with vigorous stirring, moisture being excluded. The suspension is subsequently Soxhlet extracted for 8 hours with toluene. The product, dried at 20 torr (2,700 Pa) and 40° C., contains 0.02% isocyanate groups.

EXAMPLE 3

A microgel containing hydroxyl groups is prepared from technical divinylbenzene by the procedure described by U. Seitz in "Makromolekulare Chemie" 178, 1689-1692 (1977).

(A) The microgel (10 g) containing hydroxyl groups is heated in 50 ml of dry toluene for 8 hours under reflux with exclusion of moisture together with 2.5 g of the isocyanate having the average formula

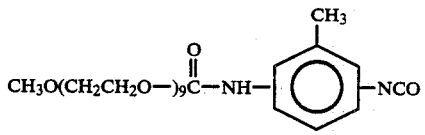

and 10 mg of 1,4-diazabicyclo(2,2,2)octane After cooling, the product is centrifuged off and subsequently dispersed in and centrifuged from toluene twice more. The product is dried under reduced pressure at room temperature. It contains 0.7% nitrogen.

(B) The microgel (10 g) containing hydroxyl groups is heated in 50 ml of dry pyridine for 16 hours under reflux with the exclusion of moisture together with 3.0 g of octadecanoyl chloride. After cooling, the product is centrifuged off, taken up in dry methanol and centrifuged once again. This procedure is repeated in order to remove pyridine and pyridine hydrochloride. After drying, the product is dispersed in 50 ml of dry toluene and heated for 20 hours under reflux in an atmosphere of nitrogen together with 15 g of 1,6-diisocyanatohexane and 10 mg of 1,4-diazabicyclo(2,2,2)octane. After cooling, the product is centrifuged off, dispersed once again in dry toluene and centrifuged off once more. This procedure is repeated a further three times. The product is dried at room temperature under reduced pressure. It contains 1.9% isocyanate groups. The product (5 g) prepared under (A), together with 5 g of the product prepared under (B) and 5 mg of 1,4-diazabicyclo(2,2,2)octane as well as 5 mg of dibutyl tin dilaurate in 30 ml of dry toluene is heated for 65 hours under reflux with stirring. After cooling, the product is filtered off, taken up once again in toluene and centrifuged once more. The product is dried at room temperature under reduced pressure. It contains less than 0.05% of isocyanate groups.

EXAMPLE 4

Carbon black having a particle size of 13 nm and containing 1.13 mEq/g of carboxyl groups and 0.44 mEq/g of phenolic hydroxyl groups bound to the surface, is reacted with isocyanate-functional hydrophilizing and hydrophobizing groups using a procedure analogous to that described in Example 3.

Similar reactions are described by N. Tsubokawa, H. Matsumoto and Y. Sone in "Journal of Polymer Science", Polymer Chemistry Edition, 20, 1943-1946 (1982).

(A) Dried carbon black (25 g) together with 5.7 g of the isocyanate having the average formula

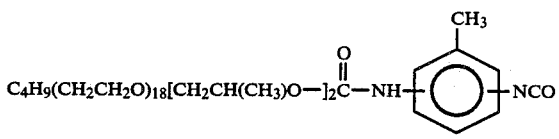

is dispersed in 300 ml of dry toluene by stirring and ultrasound action in the absence of moisture. It is subsequently heated for 12 hours under reflux with the exclusion of moisture. After cooling, the solid material is centrifuged off and Soxhlet extracted for 48 hours with toluene. After drying, the product contains 0.45% nitrogen.

(B) Dried carbon black (25 g) together with 3.9 g of octadecylisocyanate, is dispersed in 300 ml of dry toluene in the absence of moisture by stirring and by the action of ultrasound and is subsequently heated for 12 hours under reflux with the exclusion of moisture. After cooling, the solid matter is removed by centrifuging and, together with 8 g of 1,6-diisocyanatohexane, dispersed once again in 300 ml of dry toluene. After a 12-hour reaction at the refluxing temperature in the absence of moisture, the mixture is cooled and the solid matter is removed by centrifuging and subsequently Soxhlet extracted for 48 hours with dry toluene. After drying, the content of isocyanate groups in the solid matter is determined to be 1.8%.

The modified carbon black (10 g) prepared under (A), together with 10 g of the carbon black that contains isocyanate groups prepared under (B), and 200 mg of triethylamine are carefully dispersed in 300 ml of dry toluene and heated for 60 hours under reflux with exclusion of moisture. After cooling, the solid matter is centrifuged off and subsequently Soxhlet extracted for 20 hours with dry toluene. After drying, the isocyanate group content of the product is determined to be 0.05%.

EXAMPLE 5

Dried swelling starch is comminuted in a ball mill to an average grain size of 3 μm. This starch (25 g) is heated under reflux for 1 hour with exclusion of moisture in a solution of 3.3 g of octadecylisocyanate and 10 mg of triethylamine in 100 ml of cyclohexane. Subsequently, a solution of 3.4 g of the isocyanate, having the average formula

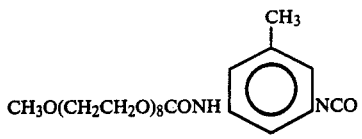

in 100 ml of dry dimethylformamide is added to the suspension. The reaction mixture is heated under reflux for a further 20 hours in the absence of moisture and with vigorous stirring. After cooling, the product is filtered off and suspended in 200 ml of toluene and filtered off once again three times. After being dried at 40° C. and 20 torr (2,700 Pa), the product contains 0.8% nitrogen.

EXAMPLE 6

Finely divided dried aluminum oxide (100 g) with a particle size of 5 to 30 nm and a surface area of 100 m$^2$/g, is suspended in a solution of 6.23 g of dodecyltriethoxysilane in 800 ml of dried cyclohexane and heated under reflux for 30 minutes. Subsequently, a solution of 6.23 g of dodecyltriethoxysilane in 200 ml of dried cyclohexane and a solution of 5.73 g of the silane having the average composition

in 500 ml of water is added to the reaction mixture. The suspension is heated under reflux for 8 hours while being stirred vigorously. After cooling, the product is filtered off and Soxhlet extracted for 24 hours with acetone. The product contains 4.5% carbon.

EXAMPLE 7

For different products are prepared from dried, pyrogenic silica having an average particle size of 12 nm and a surface area of 2200 m$^2$/g, octadecyltriethoxysilane (1) and the silane having the average formula

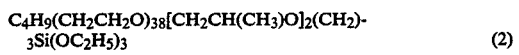

After the reaction is completed, the products are filtered off, Soxhlet extracted for 48 hours with toluene and dried at 40° C. and 20 torr (2,700 Pa).

(A) Silica (25 g), 80 mg of p-toluenesulfonic acid and 5.04 g of silane (1) are heated for 5 hours under reflux and with exclusion of moisture in 400 ml of paraffinic hydrocarbons having a boiling point of approximately 40° C. A solution of 13.4 g of silane (2) in 250 ml of dry dimethylformamide is subsequently added to the suspension. With exclusion of moisture, the reaction mixture is heated for a further 8 hours under reflux and with vigorous stirring. The product contains 9.5% carbon.

(B) Silica (25 g), 80 mg of p-toluenesulfonic acid and 5.04 g of silane (1) are heated for 5 hours under reflux and with exclusion of moisture in 400 ml of cyclohexane. A solution of 13.4 g of silane (2) in 250 ml of dry dimethyl formamide is subsequently added to the suspension. With exclusion of moisture, the reaction mixture is heated for a further 8 hours under reflux and with vigorous stirring. The product contains 14% carbon.

(C) Silica (25 g) and 1.26 g of silane (1) are heated for 1 hour under reflux and with exclusion of moisture in 400 ml of paraffinic hydrocarbons having a boiling point of approximately 40° C. A solution of 3.8 g of silane (1), 13.4 g of silane (2) and 100 mg of dodecylbenzenesulfonic acid in 250 ml of dry dimethylformamide is subsequently added to the suspension. With exclusion of moisture, the reaction mixture is heated for a further 8 hours under reflux with vigorous stirring. The product contains 11.5% carbon.

(D) Silica (25 g) and 0.5 g of silane (1) are heated for 30 minutes under reflux and with exclusion of moisture in 400 ml of paraffinic hydrocarbons having a boiling point of approximately 40° C. A solution of 4.6 g of silane (1), 13.4 g of silane (2) and 100 mg of dodecylbenzenesulfonic acid in 250 ml of dry dimethylformamide is subsequently added to the suspension. With exclusion of moisture, the reaction mixture is heated for a further 8 hours under reflux and with vigorous stirring. The product contains 15% carbon.

EXAMPLE 8

Measurement of Dispersion Stabilities

In each case, 1 g of the anisotropically modified, finely divided solid material, whose preparation is described in Example 7, is suspended in 100 ml of distilled water, ethanol or toluene. For this purpose, the suspension is moved with an impeller stirrer in a 250 ml beaker and at the same time treated with ultrasound for 15 minutes. The suspensions are subsequently transferred to 100 ml graduated cylinders. The time required to obtain 50 ml of clear, supernatant liquid is measured. The following results were obtained:

|  | Toluene | Ethanol | Water |
| --- | --- | --- | --- |
| Product B | 81 min. | 31 min. | 0.5 min. |
| Product C | 31 min. | 60 min. | 0 min. |
| Product A | 8 min. | 20 min. | 3 min. |
| Product D | 10 min. | 4 min. | >24 hours |

EXAMPLE 9

Measurement with a Langmuir Film Balance

Modified silica which is anisotropically hydrophilic and hydrophobic and the preparation of which from hydrophilically or hydrophobically modified preliminary stages is described in Example 2, is tested by means of a Langmuir film balance. The following suspensions are prepared by stirring and treatment with ultrasound:

S 1: 100 mg of hydrophilized silica A in 10 g of ethanol,
S 2: 100 mg of hydrophobized silica B in 10 g of ethanol,
S 3: 100 mg of modified silica, anisotropically hydrophilic and hydrophobic, in 10 g of ethanol,
S 4: 100 mg of hydrophilized silica A and 6 mg of palmitic acid in 10 g of ethanol,
S 5: 100 mg of hydrophobized silica B and 2.5 mg of palmitic acid in 10 g of ethanol,
S 6: 100 mg of modified silica, anisotropically hydrophilic and hydrophobic, and 2.5 mg of palmitic acid in 10 g of ethanol.

In each case, about 2 to 3 mg of these suspensions are spread on the water surface of a Langmuir trough at 25° C. The amount applied is determined accurately by weighing. After a waiting time of 10 minutes, the surface film is compressed. The pressure-area-isotherms obtained can be characterized as follows:

S 1: No pressure increase, no surface coverage detectable,

S 2: Surface coverage detectable, pressure increase to 70 mN/m, area requirement of 40 cm$^2$/mg (=4 m$^2$/g), S 3: Surface coverage detectable, pressure increase to 72 mN/m, area requirement of 47 cm$^2$/mg (=4.7 m$^2$/g), S 4: Surface coverage by palmitic acid film not detectable, surface coverage by modified silica slight, but clearly detectable.

S 5: Surface coverage by palmitic acid film detectable, surface coverage by modified silica not detectable, S 6: Surface coverage by palmitic acid film not detectable, surface coverage by modified silica detectable and almost unchanged from the result obtained with S 3.

The results obtained can be explained by adsorption of the palmitic acid on the modified silicas and changes in the surface properties of the silica particles that are caused by the adsorption, if the following assumptions are made:

Palmitic acid adsorbs on the hydrophilically modified silica A by the preferential adsorption of the carboxyl groups on the silica and, in so doing, brings about partial hydrophobization.

Adsorption of palmitic acid on the hydrophobically modified silica B, on the other hand, takes place by the preferential adsorption of the alkyl chain. The free carboxyl groups bring about a hydrophilization of the surface.

On the silica, anisotropically modified hydrophilically and hydrophobically, palmitic acid is adsorbed according to both of the possibilities described above. As a result, the previously hydrophobic regions are hydrophilized, however, the previously hydrophilic regions are at the same time hydrophobized.

EXAMPLE 10

Preparation of Emulsions, which are Prepared with the Inventively Modified Solid Material and Their Splitting (1) Solid particles (0.5 g) equipped with hydrophilic and hydrophobic domains, and prepared by grinding and modifying hollow microspheres as described in Example 1, together with 50 ml of toluene, and 50 ml of distilled water, are shaken vigorously in a half-filled, closed vessel by up and down motions. The water-in-oil emulsion formed is distinguished by an average droplet size of 0.5 mm. Although water droplets settle so that a supernatant toluene layer is formed, the water droplets are resistant to coalescence even after 12 months of storage at room temperature. Accordingly, the formation of a water phase is not observed.

To split the emulsion, it is passed through a fluted filter paper. The toluene and water in the filtrate divide into separate phases.

(2) Finely divided aluminum oxide modified in accordance with the invention, whose preparation is described in Example 6, and 60 ml of spindle oil (viscosity η=60 mPas at 20° C.) are added to a 1 l flat bottom vessel with an internal diameter of 10 cm. The suspension is stirred at 2,000 rpm with a Mizer stirrer disk 6 cm in diameter, while 40 ml of water are added within 10 minutes. The water-in-oil emulsion formed is subsequently stirred for a further 10 minutes. The temperature does not exceed 25° C.. An emulsion is obtained. To split it, the emulsion is forced through a double layer of filter paper. The oil and water in the filtrate divide into separate phases. The solid is largely retained on the filter paper.

EXAMPLE 11

Splitting a Crude Oil Emulsion

Inventively modified, finely divided solids in combination with an ethylene oxide/propylene oxide block copolymer are used as an organic, soluble splitter.

By stirring with the help of ultrasound, 0.5 g of modified solid material are finely dispersed in 4.5 g of the organic demulsifier and 95 ml of methanol. In particular, the preparations formulated and tested contain:

D 1: 5 g of organic splitter; methanol

D 2: 4.5 g of organic splitter; 0.5 g of pyrogenic unmodified silica, as used in Example 7; methanol D 3: 4.5 g of organic splitter; 0.5 g of inventively modified silica (Product C of Example 7); methanol.

In each case, 100 ml of a difficultly to split, medium heavy Venezuelan crude oil, the water content of which is 34%, is heated to 80° C. and mixed with 0.1 ml of the prepared dispersion. After vigorous shaking, the samples are allowed to stand at 90° C. After 24 hours, the amount of water settled out and the residual water content in the supernatant oil phase are determined.

| Preparation | Water Separated [ml] | Residual Water % |
|---|---|---|
| D 1 | 9 | 27 |
| D 2 | 9 | 26 |
| D 3 | 12 | 22 |

EXAMPLE 12

Foam-Stabilizing Effect of Inventively Prepared Products in Admixture with a Soluble Surfactant As a soluble surfactant, the dispersion contain a silicone surfactant, which is described in German Pat. No. 1,802,052. The product has the following structure:

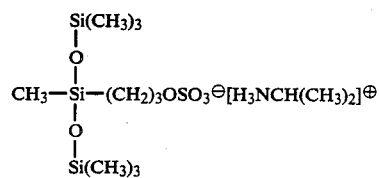

In this patent, a foam beating test is described which consists of moving a perforated disk 40 times up and down in a vertical cylinder within the 3 cm high layer of liquid that is to be foamed. The height of the column of foam formed and time required for 50% of the foam to change back to liquid are determined. The following preparations, all of which were prepared with distilled water, were tested by this method:

Z 1: 2% silicone surfactant,

Z 2: 1.8% silicone surfactant, 0.2% untreated pyrogenic silica as used in Example 7, Z 3: 1.8% silicone surfactant, 0.2% product (B) from Example 7;

Z 4: 1.8% silicone surfactant, 0.2% product (A) from Example 7;

Z 5: 1.8% silicone surfactant, 0.2% product (D) from Example 7.

Preparations Z 3, Z 4, and Z 5 contain the inventively prepared solid particles. The following results are obtained:

| Preparation | Foam Height (cm) | Half-Life Time (min.) |
|---|---|---|
| Z 1 | 11 | 2.90 |
| Z 2 | 13.5 | 2.45 |
| Z 3 | 8 | 0.70 |
| Z 4 | 17 | 3.68 |
| Z 5 | 16 | 4.50 |

As the results show, adapting the modification of the finely divided solid material to the application, especially with respect to the balance between the hydrophilic and the hydrophobic groups, is a prerequisite for the effectiveness of a product. The data obtained from testing dispersability in toluene, ethanol and water, are the criteria for selecting a product.

EXAMPLE 13

Displacing Oil from Saturated Sand Beds

Sand beds are prepared by shaking silica sand having a particle size distribution from 0.01 to 0.15 mm, in a plexiglass tube. The tube is 50 cm in length and 3 cm in diameter. The sand beds are saturated at 50° C. first with salt water (2% salinity) and then with a water-free crude oil (North Sea). Subsequently, the residual oil content is adjusted by flooding with salt water to about 30% of the oil originally present, before the bed is flooded with the solutions or dispersions to be tested.

The soluble surfactant used is a naphthenic acid carboxy betaine (with a molecular weight of 397) of the type described in German Patent No. 25 32 469. The surfactant is not adapted optimally to the existing oil/water system by mixing it with a different surfactant.

Besides the inventively modified, finely divided solid materials, a silica isolated from the DB 31 ® product of the Dow Corning Corporation is also used.

The following seven preparations in water with a salinity of 2% are used for the oil displacement test:

T 1: 2% naphthenic acid carboxy betaine,
T 2: 1.5% of naphthenic acid carboxy betaine, 0.5% of pyrogenic silica, as used for the preparation of the product described in Example 7,
T 3: 1.5% naphthenic acid carboxy betaine, 0.5% silica from DB 31 ®,
T 4: 1.5% naphthenic acid carboxy betaine, 0.5% product (B) from Example 7,
T 5: 1.5% naphthenic acid carboxy betaine, 0.5% product (C) from Example 7,
T 6: 1.5% naphthenic acid carboxy betaine, 0.5% product (A) from Example 7,
T 7: 1.5% naphthenic acid carboxy betaine, 0.5% product (D) from Example 7.

The preparations are prepared by dispersing the finely divided solid materials in the aqueous naphthenic acid carboxy betaine solution by stirring with simultaneous ultrasound treatment.

In each case, after 1.5 pore volumes of the preparations tested have been pumped through the sand bed, the oil removal achieved, and with it, the additional displacement relative to flooding with water, are measured.

| Preparation | Oil Displacement With Salt Water % | Total Oil Displacement % | Additional Oil Displacement % |
|---|---|---|---|
| T 1 | 76 | 76 | 0 |
| T 2 | 77 | * | * |
| T 3 | 78 | 82 | 4 |
| T 4 | 79 | 80.5 | 1.5 |
| T 5 | 79 | 82 | 3 |
| T 6 | 79 | 88 | 9 |
| T 7 | 78 | 79 | 1 |

*Leads to blockage of the sand bed.

As in Example 8, it is seen here also that the modification of the finely divided solid material used must be adapted to the application.

We claim:

1. Particles comprising fragments having a size of less than 100 μm, said fragments being insoluble in organic solvents and water and having on one side thereof hydrophilic groups and on the other side thereof hydrophobic groups, said hydrophilic and hydrophobic groups being distributed anisotropiclaly in a non-statistical manner, in separate hydrophilic and hydrophobic domains on the surface of said fragments.

2. The particles of claim 1 wherein the hydrophilic groups are polyoxyethylene groups.

3. The particles of claim 1 wherein from 0 to 30 mole percent of the oxyethylene units are replaced by oxypropylene units.

4. The particles of claim 1 wherein the hydrophobic groups are hydrocarbon groups.

5. The particles of claim 4 wherein the hydrocarbon groups are alkyl or aryl groups.

6. The particles of claim 4 wherein the hydrocarbon groups are substituted alkyl or substituted aryl groups.

7. The particles of claim 1, 2, 3, 4, 5 or 6 wherein the hydrophilic groups, hydrophobic groups, or both, are linked with the particle matrix through a bridge selected from the group consisting of

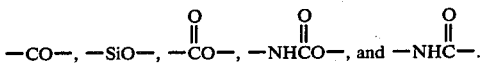

8. Particles according to claim 1, wherein said fragments are obtained by comminution of hollow microspheres.

9. Particles according to claim 1, composed of a silicate material or of glass.

10. Particles having a size of less than 100 μm, asid particles being insoluble in organic solvents and water and having polyoxyethylene and hydrophobic groups at their surface, said groups being distributed anisotropiclaly in a non-statistical manner on the surface of the particles in separate polyoxyethylene and hydrophobic domains.

* * * * *